United States Patent [19]

Miller

[11] Patent Number: 5,397,180
[45] Date of Patent: Mar. 14, 1995

[54] MOTIONLESS MIXER TUBE FOR RESIN DISPENSING EQUIPMENT

[75] Inventor: Kenneth L. Miller, Indianapolis, Ind.

[73] Assignee: Liquid Control Corporation, North Canton, Ohio

[21] Appl. No.: 147,980

[22] Filed: Nov. 5, 1993

[51] Int. Cl.⁶ .............................................. B01F 5/06
[52] U.S. Cl. .................... 366/338; 222/145
[58] Field of Search ............... 366/336, 337, 338, 339, 366/340; 138/38, 42; 222/145

[56] References Cited

U.S. PATENT DOCUMENTS

| | | | |
|---|---|---|---|
| 3,514,131 | 5/1970 | McKinney | 285/332 |
| 3,806,084 | 4/1974 | Seese | 251/63 |
| 4,074,363 | 2/1978 | Croft | 366/339 |
| 4,294,250 | 10/1981 | Dennehey | 128/247 |
| 4,753,536 | 6/1988 | Spehar | 366/338 |
| 4,850,705 | 7/1989 | Horner | 366/338 |
| 5,047,021 | 9/1991 | Utterberg | 604/283 |
| 5,092,492 | 3/1992 | Centea | 222/137 |
| 5,190,534 | 3/1993 | Kendell | 604/905 |

*Primary Examiner*—Robert W. Jenkins
*Attorney, Agent, or Firm*—Michael Sand Co.

[57] ABSTRACT

A motionless mixer tube for mounting on the end of a discharge nozzle of a dispensing device for mixing and dispensing extremely small volumes of a pair of liquid materials, such as chemical reacting resins. The mixer tube has an elongated housing with a female luer lock at one end for mounting the tube on the dispensing device, and a male luer lock on the other end for easily mounting a dispensing needle on the outlet end of the housing. A helical motionless mixer element is mounted in a bore of the tube housing and extends from immediately adjacent the outlet end of an inlet socket of the female luer lock to immediately adjacent the outlet end of a discharge nozzle of the male luer lock. The dispensing needle is mounted immediately adjacent the outlet end of the discharge nozzle and mixer element. This arrangement avoids dead spaces within the mixer tube to prevent the formation of disruptive air bubbles therein and enables secure and rapid attachments at both ends of the tube.

16 Claims, 2 Drawing Sheets

FIG-1
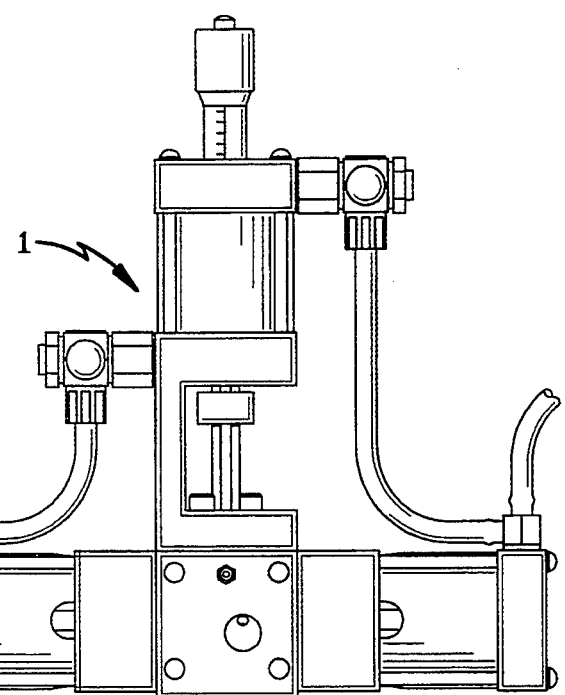
FIG-2
FIG-6
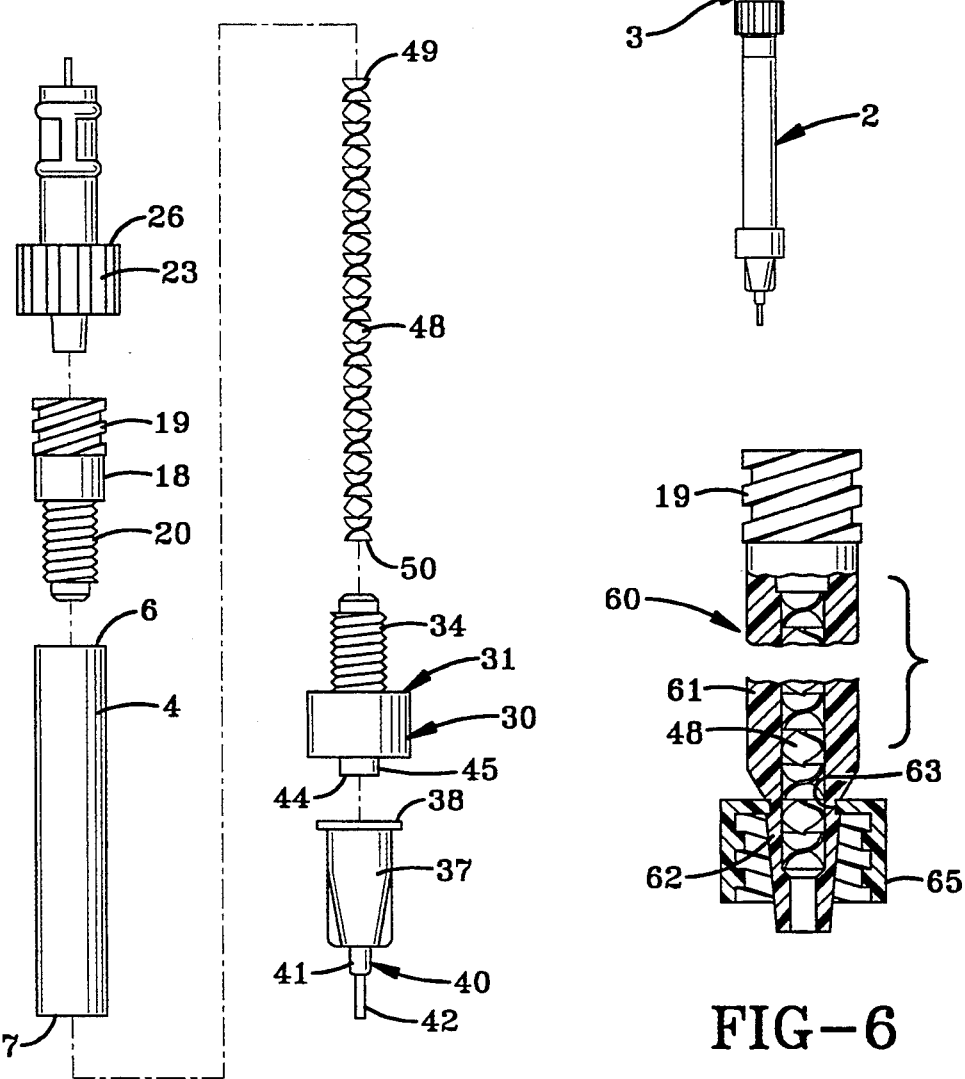

MOTIONLESS MIXER TUBE FOR RESIN DISPENSING EQUIPMENT

BACKGROUND OF THE INVENTION

1. Technical Field

The invention relates to dispensing devices and more particularly to a motionless mixer tube for mounting on the end of a dispensing device for mixing together at least two liquid materials, such as resin compounds. More particularly, the invention relates to such a motionless mixer tube for mixing and dispensing small volumes or shots of the mixed material.

2. Background Information

An increasing number of products require the dispensing of liquid or semi-liquid flowable materials in one form or another for their manufacture. These flowable materials typically comprise two chemically reactive component resins. The types of materials dispensed include various flowable liquid, semi-liquid or pastes such as epoxies, polyurethanes, silicones, polyesters, acrylics, polysulfides, as examples. Common commercial manufacturing processes in which such materials are used include injecting precise amounts of mixed resins into molds, encapsulating electric components with insulating resins, applying continuous beads of structural adhesives, injecting sealing joints and numerous other functions requiring the accurate control, delivery and mixing of two reactive component materials. Examples of the product application which use small volumes of the mixed resins include under the hood electronic assemblies and safety devices for the automotive and trucking industry, encapsulation of magnetic and electrical devices, such as the mounting of components on circuit board assemblies for switches, power supplies, heating assemblies and other electronic components for various industries.

Thus, as the aforesaid flowable mixed materials continue to be consumed in increasing quantities the demand for precise liquid and semi-liquid metering, mixing and dispensing devices and equipment is also growing at an accelerated rate. The industry is continuously searching for more reliable, efficient and accurate dispensing devices for plural component flowable materials for a variety of purposes. For example, a particular application may require that a device efficiently and accurately mixes and dispenses such plural materials ranging in shot or dot sizes from 0.00003 cubic centimeters to several cubic centimeters.

When dispensing such small volumes of such plural mixed components, it is extremely harmful for even very small air bubbles to be trapped within the dispensing nozzle since they are difficult to purge and will materially affect the amount of resin being dispensed and the mixing thereof. The purging of such air bubbles is more easily accomplished in dispensing devices, and in dispensing tubes and nozzles for larger discharged shots or streams of material than set forth above. However, the air bubbles that are trapped occasionally can become larger than the actual size of the shot of material to be dispensed from the nozzle when small volumes or shots are being dispensed, and thus present a very serious problem and are difficult to satisfactorily purge from the equipment.

Some examples of prior art metering, mixing and dispensing devices for two component liquid materials are shown in U.S. Pat. Nos. 5,092,492; 4,095,722 and in pending patent application Ser. No. 08/115,820 filed Sep. 3, 1993, and assigned to the same assignee as is the present application. When the two component resins are dispensed from a liquid metering and dispensing device, such as shown in U.S. Pat. No. 5,092,492 and the above identified pending application, the two components are dispensed into a motionless mixer, preferably of the type which has a helical mixing element therein, wherein the two separate streams are completely and thoroughly mixed and combined as they move through the mixing element before they are discharged from the outlet end of the motionless mixer. Again, it is the prevention of the formation of air bubbles in these motionless mixers, especially when used for dispensing extremely small volumes of mixed components that must be eliminated.

Furthermore, it is desirable that these motionless mixers, which for many applications are inexpensive, disposable, throw-away items, be able to be securely attached and removed quickly and conveniently from the discharge end of the dispensing equipment, and that when used for extremely small shots, that the dispensing needle thereof be easily attached and removed from the end of the motionless mixer for cleaning, repair, replacement, etc.

Therefore, the need exists for an improved motionless mixer tube for use with liquid metering and dispensing devices in which plural component materials are metered and dispensed from the device into the motionless mixer for subsequent mixing and dispensing at the point of application. Moreover, the need also exists for such a motionless mixer tube which is easily attached to and removed from the metering device, and which permits the easy, rapid and secure attachment of a dispensing needle on the discharge end of the motionless mixer tube, and that the motionless mixer tube prevents or greatly reduces the formation of air bubbles therein.

SUMMARY OF THE INVENTION

Objectives of the invention include providing an improved motionless mixer tube for mounting on the discharge end of a liquid metering and dispensing device, in which at least two liquid components are positively metered and dispensed into the motionless mixer tube for subsequent mixing and discharge at the point of application.

Another objective of the invention is to provide such a motionless mixer tube which is attached to and removed easily from the dispensing device by the use of a luer lock, and which uses another luer lock at the discharge end of the motionless mixer tube for attaching and removing a dispensing needle.

A still further objective of the invention is to provide such a motionless mixer tube in which a motionless helical mixing element is mounted within the bore of the mixer tube and communicates directly with and immediately adjacent to the outlet end of the dispensing nozzle, and at the opposite end is located immediately adjacent to the inlet of the dispensing needle, eliminating any dead space within the motionless mixer tube which heretofore caused the formation of harmful air bubbles.

Another objective of the invention is to provide such a motionless mixer tube which is of a simple construction, which achieves the stated objectives in a simple, effective and inexpensive manner, which solves problems and satisfies needs existing in the art.

These objectives and other advantages are obtained by the motionless mixer tube of the present invention, the general nature of which may be stated as including a motionless mixer tube adapted to be mounted on a discharge nozzle of a dispensing device for mixing and dispensing at least a pair of liquid materials, said tube including an elongated housing formed with a hollow internal cylindrical bore extending therethrough having inlet and outlet ends; a female luer lock provided at the inlet end of the housing having an inlet socket for removably securing the discharge nozzle of a dispensing device thereon; a male luer lock provided at the outlet end of the housing and having an outlet nozzle; a dispensing needle formed with a hollow bore and having inlet and outlet ends removably mounted on the housing by the male luer lock, said inlet end of the dispensing needle being located adjacent the outlet end of the outlet nozzle of the male luer lock; and a helical motionless mixing element mounted within the housing and extending from an outlet end of the inlet socket of the female luer lock and an outlet end of the outlet nozzle of the male luer lock.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 1 is a plan view of a metering and dispensing device for two components having the improved motionless mixer tube mounted thereon;

FIG. 2 is an enlarged exploded plan view of the motionless mixer tube removed from the device of FIG. 1;

FIG. 5 is a sectional view of a modified motionless mixer tube; and

FIG. 6 is a fragmentary sectional view of another embodiment of the motionless mixer tube.

Similar numerals refer to similar parts throughout the drawings.

DESCRIPTION OF THE PREFERRED EMBODIMENTS

Figure 3:
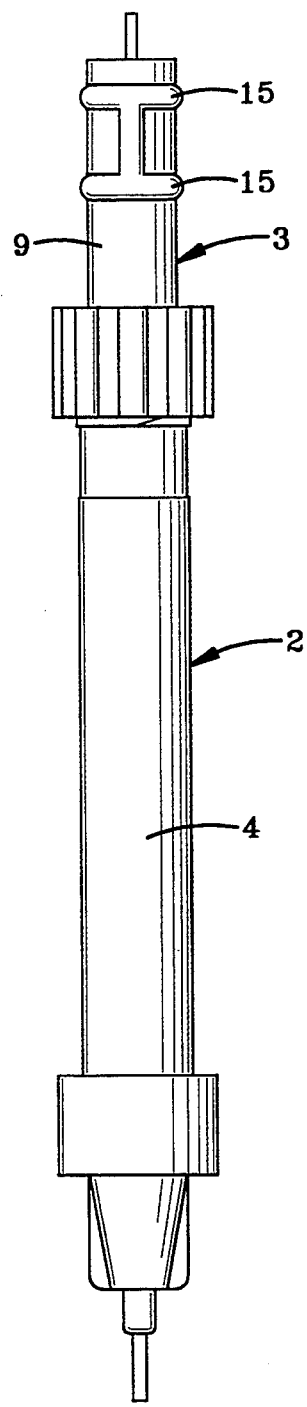
FIG. 3 is a further enlarged plan view of the motionless mixer tube of FIG. 2 in assembled condition.
Figure 4:
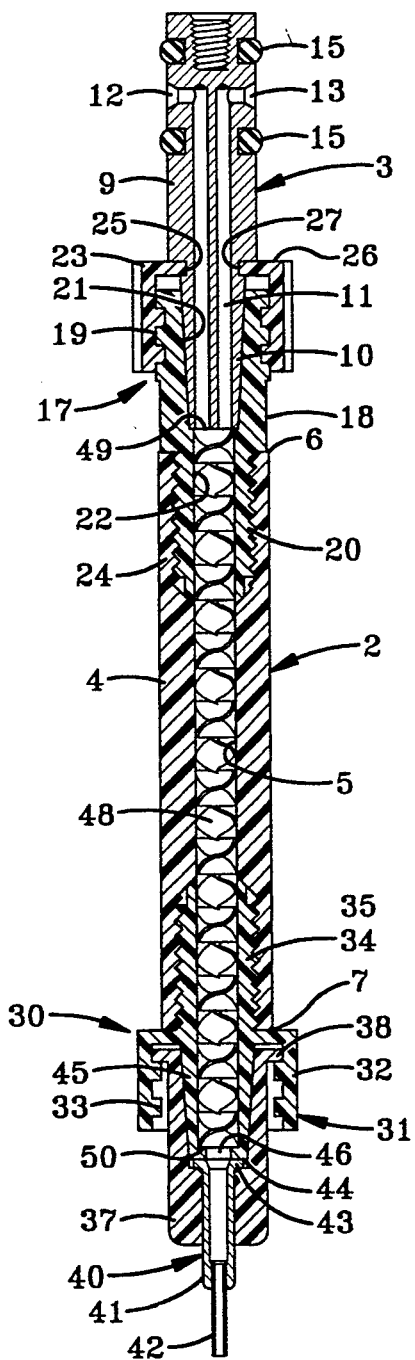
FIG. 4 is a longitudinal sectional view of the motionless mixer tube of FIG. 3.

FIG. 1 shows one type of plural component metering and dispensing device indicated generally at 1, which is of the type shown in the above referenced pending patent application U.S. Ser. No. 08/115,820, or could be of the type of metering and dispensing device as shown in U.S. Pat. No. 5,092,492. The improved motionless mixer tube of the present invention is indicated generally at 2, and is shown mounted on a dispensing nozzle 3 of device 1. A first embodiment of mixer tube 2 is shown in FIGS. 2–4 of the drawings.

Tube 2 is shown in an exploded condition in FIG. 2, and includes a cylindrical elongated housing 4 having a cylindrical hollow interior or bore 5 (FIG. 4), and an inlet end 6 and an outlet end 7. One type of discharge nozzle 3 is shown in detail in FIG. 4, and includes a cylindrical body 9 having a lower tapered discharge end 10. Body 9 and end 10 are formed with a hollow bore 11 which is divided into two flow channels, each of which communicates with a respective inlet port 12 and 13, which in turn receive the metered amounts of resin materials which are dispensed from device 1 as described more fully in the above referenced patent and pending application. A pair of O-rings 15 are mounted in annular grooves formed in cylindrical body 9 of dispensing nozzle 3, to sealingly secure nozzle 3 within the outlet end of dispensing device 1, in a manner well known in the art. Dispensing nozzle 3 preferably is formed of stainless steel or the like with the O-rings being formed of a usual elastomeric material.

In accordance with one of the features of the invention, a female luer lock indicated generally at 17, is mounted on inlet end 6 of mixer tube housing 4. Female luer lock 17 includes a one-piece body 18 having an externally threaded inlet end portion 19 and an externally threaded outlet end portion 20. Body 18 is formed with an upper tapered internal inlet socket 21 which extends inwardly from the inlet end of the luer lock body and communicates with an internal cylindrical bore portion 22, which extends from the end of inlet socket 21 to the outlet end of the luer lock body. Body 18 is threadably engaged by external threaded end portion 20 into a complementarily internally threaded portion 24 of inlet end 6 of tube housing 4.

A usual luer lock connecting ring 23 is easily threadably engaged with external thread portion 19 and is formed with a top opening 25 in a top wall 26 thereof. Top wall 26 of ring 23 is snap-fitted into an annular groove 27 formed in dispensing nozzle 3 at the junction of cylindrical portion 9 and tapered portion 10 for mounting mixer tube 2 onto the end of dispensing nozzle 3. Taper portion 10 has a male luer taper complementary to socket 21 of female luer lock 17.

A male luer lock indicated generally at 30, connects a dispensing needle assembly 40 to outlet end 7 of tube 2. Lock 30 (FIGS. 2–4) includes a locking ring, indicated generally at 31, which has a cylindrical wall 32 formed with internal threads 33 and a cylindrical externally threaded body 34 projecting outwardly from ring wall 32. Body 34 is threadedly engaged with an internally threaded portion 35 of outlet end 7 of tube housing 4. A tapered outlet nozzle 45 is formed integrally with body 34 and extends outwardly therefrom.

Some examples of known luer locks used for unrelated applications are shown in U.S. Pat. Nos. 4,294,250, 5,190,534, 5,047,021 and 3,514,131.

Dispensing needle assembly 40 includes a hollow cylindrical body 41 preferably formed of metal, which is molded within the interior of an outer winged locking connector 37, and has a hollow cylindrical dispensing tip 42 extending from body 41. Needle body 41 terminates in an outturned top end flange 43 which abuts against an end wall 44 of tapered male luer lock outlet nozzle 45. A hole 46 is formed in end wall 44 and is approximately the same size as the hollow interior of needle body 41 and communicates therewith to provide communication with tube housing bore 5. Locking connector 37 terminates in an annular outturned end flange 38 which threadedly engages internal threads 33 of ring 31 to easily, yet securely fix, dispensing needle assembly 40 on the outlet end of tube housing 4. Connector 37 is formed with a tapered upper interior 47 which is complementary to the exterior taper of outlet nozzle 45, which is the male tapered portion of male luer lock 30.

A usual helical motionless mixer element 48, the flites of which have an outer diameter complementary to the internal diameter of bore 5, is slidably mounted in bore 5. In accordance with one of the features of the invention, inlet end 49 of mixer 48, is located immediately adjacent to the outlet end of tapered inlet socket 21 of female luer lock 17 which is complementary with the discharge end of the male tapered portion 10 of dispensing nozzle 3, as shown in FIG. 4. Furthermore, the outlet end 50 of mixing element 48 is located immediately adjacent or is in contact with end wall 44 of the male tapered outlet nozzle 45 of male luer lock 30. The close proximity or contact of inlet and outlet ends 49 and 50 of motionless mixing element 48 with the outlet end of tapered portion 10 of the dispensing nozzle 3 and with end wall 44 of male luer lock 30, respectively, provides for a continuous flow path through the mixer tube and prevents the formation of dead spaces or pockets in which air bubbles can be formed. As indicated previously, these air bubbles are difficult to expel from the motionless mix tube, especially when the tube and dispensing needle assembly have small internal diameters when used for the dispensing of extremely small shots of mixed resin materials.

In the preferred embodiment, the internal diameter of housing bore 5 is approximately 0.127 inches with the internal bore of dispensing tip 42 being in the range of 0.063 inches down to 0.006 inches. Likewise, the size of a shot of material being dispensed may have a volume of between 0.005 cc and greater. The size or volume of the discharged shot or dot is dependent primarily on the size of the metering rod and stroke length thereof in dispensing device 1.

Thus, the male and female luer locks provide an extremely effective, secure and easily manipulated locking arrangement for mounting tube 2 onto dispensing nozzle 3 of a metering and dispensing device, as well as for the mounting of dispensing needle assembly 40 on the outlet end of tube 2.

A modified form of the improved motionless mixer tube is indicated generally at 53, and is shown in FIG. 5. Tube 53 has an externally threaded end portion 54 of the female luer lock formed integrally with a tube housing 55. Likewise, an internally threaded locking ring 56 and a tapered male discharge nozzle 57 of a male luer lock, are both formed integrally with tube-housing 55. This forms a one-piece member for the subsequent attachment to connector ring 23 of the dispensing nozzle, and the subsequent attachment of needle assembly 40 at the outlet end thereof. This avoids the forming of a plurality of different parts as for dispensing tube 2 described previously.

A portion of a third embodiment indicated generally at 60, is shown in FIG. 6. In this embodiment, the discharge end of a tube housing 61 is formed with a tapered end 62 which forms the male discharge nozzle portion of the male luer lock. End 62 is formed with an annular groove 63 for the snap mounting of an internally threaded lock ring 65 thereon, for the subsequent attachment of dispensing needle assembly 40 by winged locking connector 37 as described above. With this arrangement, a standard swivel threaded connector or lock ring 65 is used, and will facilitate the molding of the motionless tube mixer in a less complicated mold than required for the one-piece embodiment 53 of FIG. 5 and the multiple component embodiment shown in FIG. 4.

The advantages for both the second and third embodiments 53 and 60 are the same as for embodiment 2, that is, the ease of assembling and disassembling the mixer tube onto and off of a dispensing nozzle 3 of a metering and dispensing device, and for the installation and removal of a dispensing needle assembly 40 at the discharge end thereof. Most importantly, it provides for the reduction or prevention of air bubbles within the fluid flow passage from the dispensing outlet of nozzle 3 through the motionless mixer and out of the discharge end of dispensing tip 42 by eliminating voids or dead spaces.

Accordingly, the improved motionless mixer tube is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved motionless mixer tube is constructed and used, the characteristics of the construction, and the advantageous, new and useful results obtained; the new and useful structures, devices, elements, arrangements, parts and combinations, are set forth in the appended claims.

I claim:

1. A motionless mixer tube adapted to be mounted on a discharge nozzle of a dispensing device for mixing and dispensing at least a pair of liquid materials, said tube including:

an elongated housing formed with a hollow internal cylindrical bore extending therethrough having inlet and outlet ends;

a female luer lock provided at the inlet end of the housing and having an inlet socket for removably securing the discharge nozzle of a dispensing device therein;

a male luer lock provided at the outlet end of the housing and having an outlet nozzle;

a dispensing needle formed with a hollow bore and having inlet and outlet ends removably mounted on the housing by the male luer lock, said inlet end of the dispensing needle being located adjacent the outlet end of the outlet nozzle of the male luer lock; and a helical mixing element mounted within the bore of the housing and extending from and adjacent to an outlet end of the inlet socket of the female luer lock, and the outlet end of the outlet nozzle of the male luer lock.

2. The mixer tube defined in claim 1 in which the inlet socket of the female luer lock is tapered inwardly toward the outlet end of said socket.

3. The mixer tube defined in claim 2 in which the female luer lock has an externally threaded end portion; and in which an internally threaded locking ring threadably engages said externally threaded portion for mounting the housing on a discharge nozzle of a dispensing device.

4. The mixer tube defined in claim 1 in which the male luer lock includes a locking ring having internal threads for coupling engagement with a locking connector of the male luer lock.

5. The mixer tube defined in claim 4 in which the locking ring of the male luer lock is formed with an externally threaded portion which is threadably engaged in the outlet end of the housing; and in which the locking ring is formed as a one-piece member with said externally threaded portion and the outlet nozzle.

6. The mixer tube defined in claim 4 in which the locking ring of the male luer lock is a separate adapter ring freely rotatably mounted on the outlet nozzle of the male luer lock.

7. The mixer tube defined in claim 4 in which the locking ring and outlet nozzle of the male luer lock and an externally threaded portion of the female luer lock is formed as a one-piece plastic member with the housing.

8. The mixer tube defined in claim 4 in which the male luer lock connector has an outturned annular end flange which engages the internal threads of the locking ring of the male luer lock.

9. The mixer tube defined in claim 1 in which the dispensing needle has an elongated hollow annular body and a dispensing tip extending outwardly from one end of said body.

10. The mixer tube defined in claim 9 in which another end of the dispensing needle body is formed with an outturned annular flange; and in which said flange is clamped against an outlet end of the outlet nozzle of the male luer lock by a male luer lock connector.

11. The mixer tube defined in claim 1 in which the inlet socket and externally threaded end portion of the female luer lock is a one-piece member and includes another externally threaded end portion which is threadably mounted on the inlet end of the housing.

12. The mixer tube defined in claim 1 in which the dispensing needle has a locking connector which is formed with a tapered interior; and in which the outlet nozzle of the male luer lock is tapered and is complementary to and is seated in the tapered interior of said locking connector.

13. In combination, a discharge nozzle of a dispensing device which meters and dispenses at least two separate liquid materials streams from a pair of end openings formed in said nozzle, and a mixer tube mounted on said discharge nozzle; said mixer tube including an elongated housing formed with a hollow internal cylindrical bore extending therethrough having inlet and outlet ends; a female luer lock provided at the inlet end of the housing and having an inlet socket for removably securing the discharge nozzle of a dispensing device therein; a male luer lock provided at the outlet end of the housing and having an outlet nozzle; a dispensing needle formed with a hollow bore and having inlet and outlet ends removably mounted on the outlet end of the housing by the male luer lock, said inlet end of the dispensing needle being immediately adjacent the outlet end of the outlet nozzle of the male luer lock; and a helical motionless mixing element mounted within the bore of the housing and extending from and adjacent to an outlet end of the inlet socket of the female luer lock and adjacent to the outlet end of the outlet nozzle of the male luer lock.

14. The combination defined in claim 13 in which the discharge nozzle has a body tapered inwardly toward the pair of end openings; and in which the inlet socket of the female luer lock has an internal taper complementary to the tapered body of the discharge nozzle for receiving said body therein.

15. The combination defined in claim 13 in which the outlet nozzle of the male luer lock has a tapered body portion; in which an annular groove is formed in said tapered body portion; and in which a lock ring is snap-mounted in said groove of the tapered body portion.

16. A mixer tube adapted to be mounted on a tapered discharge nozzle of a dispensing device for mixing and dispensing at least a pair of liquid materials, said tube including:

an elongated housing formed with a hollow internal cylindrical bore extending therethrough having inlet and outlet ends, said inlet end having a tapered inlet socket adapted to receive a tapered nozzle of a dispensing device therein, and having a tapered discharge nozzle at the outlet end;

first attachment means on the inlet end of the housing for removably securing the housing on a discharge nozzle of a dispensing device;

a dispensing needle assembly having a tapered interior;

second attachment means on the outlet end of the housing for removably mounting the needle assembly on the outlet end of the housing, with the discharge nozzle being seated in and complementary to said tapered interior of the needle assembly; and a mixing element mounted within the bore of the housing and extending from and adjacent to an outlet end of the tapered inlet socket, and an outlet end of the tapered discharge nozzle.

* * * * *